Patented May 26, 1931

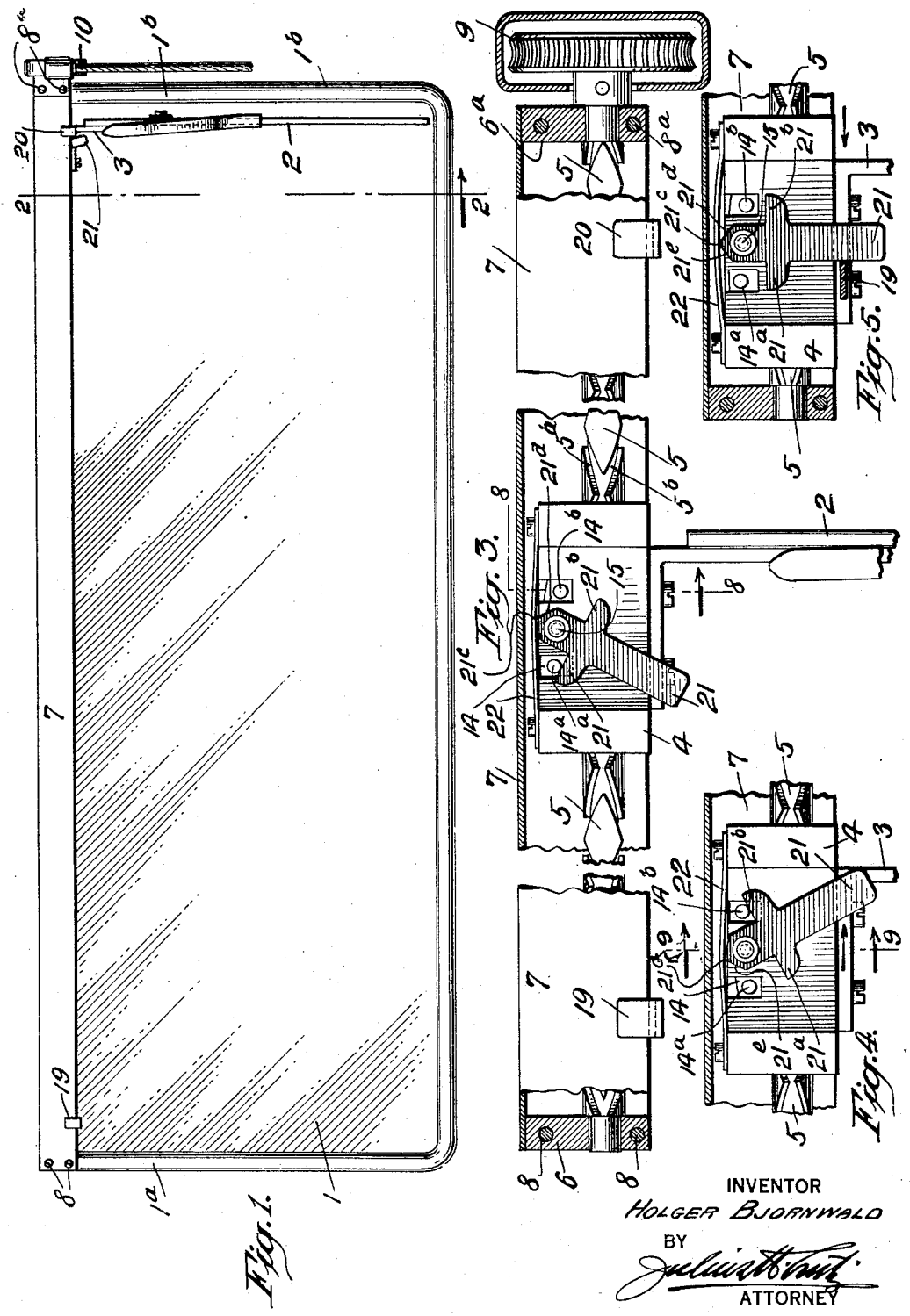

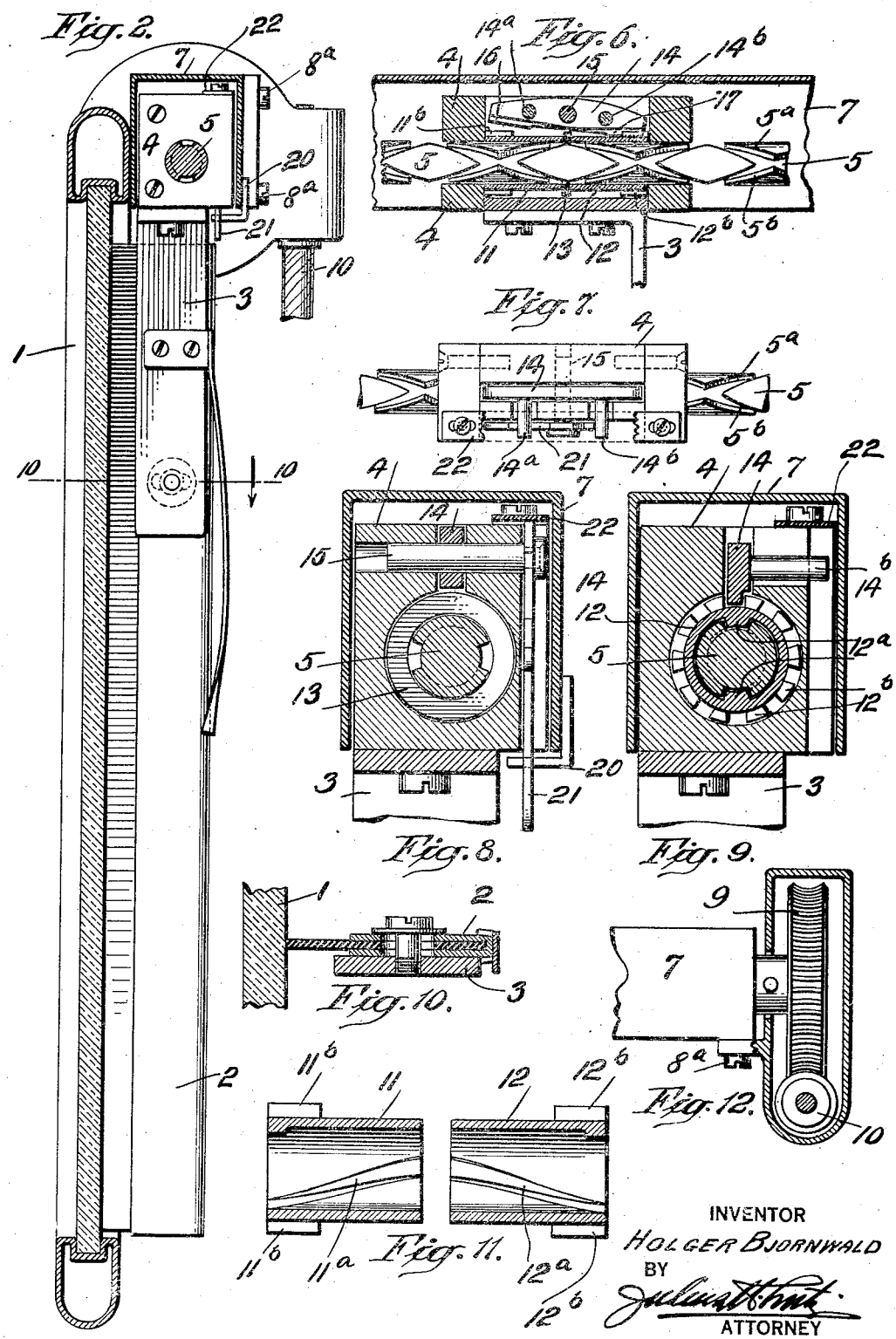

1,807,372

UNITED STATES PATENT OFFICE

HOLGER BJORNWALD, OF NEW YORK, N. Y.

CARRIAGE REVERSING MECHANISM FOR WINDSHIELD CLEANERS AND THE LIKE

Refiled for abandoned application Serial No. 539,875, filed February 28, 1922. This application filed June 27, 1930. Serial No. 464,187.

This invention relates to improvements in carriage-reversing mechanism for windshield cleaners and the like and constitutes a refiling of an abandoned application filed by me on the 28th day of February, 1922, and bearing the Serial Number 539,875.

The principal objects of this invention are to produce an improved carriage-reversing mechanism for windshield cleaners and the like which may be operated by any suitable power and which will in its automatic reversing action operate positively and without sticking; to provide simple and inexpensive mechanism including a rotatable screw having oppositely-disposed threads, a carriage movable along the screw and means for connecting the carriage to the screw including a bar mounted pivotally on said carriage, and having locking dogs at opposite ends and means for swinging the same so as alternately to connect the carriage with the oppositely-disposed threads of the screw, and whereby such pivotal movement of said bar to its opposite positions will simultaneously cause the disengagement of one locking dog and the positive engagement of the other dog, and I also preferably provide means for retaining such dogs in their respective engaging and disengaging positions comprising a single flat spring.

Another object of my invention is to provide a pair of oppositely-threaded nuts, each nut having its threads meshing with one of the oppositely-disposed threads on said screw and connecting or locking dogs preferably pivotally mounted on the carriage and adapted alternately to engage said nuts and to connect the same alternately to the carriage, whereby the carriage will be caused to travel in opposite directions in accordance with the nut with which it is connected which will of course by such connection be prevented from rotating and will be caused to travel along the screw thread, while the opposite member of the pair will rotate freely on the screw in reverse direction.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is an elevation of an automobile windshield to which my cleaner is applied;

Fig. 2 is a section on the line 2—2 of Fig. 1, looking in the direction of the arrow;

Fig. 3 is an enlarged side elevation of the mounting bar for the operating mechanism partly broken away and partly in section and showing in side elevation the position of the carriage parts while moving in one direction;

Fig. 4 is a enlarged side elevation of the carriage showing the position of the parts while moving in the opposite direction;

Fig. 5 is a similar view of the carriage showing the parts just before reversing;

Fig. 6 is a vertical section through the carriage showing the screw in elevation;

Fig. 7 is a plan view of the carriage showing the flat spring at the top broken away;

Fig. 8 is a section on the line 8—8 of Fig. 3;

Fig. 9 is a section on the line 9—9 of Fig. 4;

Fig. 10 is a section on the line 10—10 of Fig. 2;

Fig. 11 is a vertical section through the oppositely-threaded nuts removed from the screw and carriage; and

Fig. 12 is a plan partly in section showing the worm gear and flexible drive shaft.

Referring now to these drawings, I have illustrated a preferred embodiment of my invention as applied to an automobile windshield 1, though it will be apparent that my improved cleaner is applicable for a variety of windows in different structures. As shown, my improved cleaner comprises a wiper-bar 2 disposed vertically in relation to the glass of the windshield 1 and mounted upon a depending bracket 3 of a carriage 4 mounted upon a rotatable screw 5 having oppositely-disposed threads $5^a$—$5^b$. The said screw 5 is rotatably mounted at its opposite ends in end blocks 6—6ª of a casing comprising a U-shaped bar 7 which encloses the screw and carriage and is connected, as shown, by screws 8—8ª to the side rails 1ª—1ᵇ of the windshield 1 at the upper edge thereof. The screw 5 may be rotated from any suitable source of power, and, as shown, one end of the screw has fixed thereto a worm gear 9 which meshes with a worm 10 on the end of a flexible shaft 11 which may be connected to the motor or with any suitable driving means.

Mounted on the screw 5, in the preferred embodiment of my invention, are a pair of oppositely-threaded nuts 11 and 12 which are provided with threads 11ª—12ª meshing with the oppositely-disposed threads on the screw 5. These nuts 11 and 12 are preferably disposed adjacent to each other and separated by a washer 13 and are, as shown, rotatable in the carriage 4.

It will be obvious that if one of these nuts, when so mounted and associated in a carriage, is fixed against rotation and the other one is permitted to ride loose and rotate on the screw, the fixed nut will travel along the screw and will move the carriage therewith, while the other rotating nut will be carried along. Such nuts may be made of sufficient length to span the distance between the crossing portions of the oppositely-disposed threads of the screw and prevent a sticking of the carriage at any of such crossings. In order to lock one of these nuts to the carriage while permitting the other one to rotate freely on the screw and to procure a positive engagement of the carriage with such nut, I preferably mount above such nuts a coupler-bar 14 pivoted at 15 and having at its opposite ends dogs or projections 16 and 17 respectively adapted to engage alternately with exterior projections 11ᵇ or 12ᵇ on the respective nuts 11 and 12.

In order to procure an automatic reversing of the carriage, I provide limiting stops 19 and 20 at opposite ends of the U-shaped bar 7 which are adapted to engage with a cross-shaped reversing pawl 21 which is preferably pivoted on the bar pivot 15 and is provided at opposite sides with arms 21ª—21ᵇ which are adapted upon swinging into opposite positions to engage studs 14ª—14ᵇ at opposite ends of the bar 14, for the purpose of swinging the same about the pivot 15. The pawl 21 is provided above its pivot 15 with a centrally-located pointed end 21ᶜ having flat faces 21ᵈ—21ᵉ on opposite sides of the point and a flat spring 22 is connected at opposite sides to the carriage and bears against the pointed end 21ᶜ, so as to exert resilient pressure alternately on the faces 21ᵈ—21ᵉ when the said pawl is swung past center in either direction and to retain the same in either of the extreme positions into which it is swung.

One of the cross arms, as for example 21ª, is adapted to engage one of the studs, as for example, the stud 14ª, and when so engaged the cross arm will lift the stud and cause the coupler-bar 14 to be swung on its pivot, thus disengaging the projection 16 from the teeth or projections 11ᵇ on the nut 11.

As will be understood from an examination of Fig. 5, either one of the dogs or projections 16 or 17 will be caused to remain in mesh until it is forced out of mesh by the actual engagement with a cross arm of the reversing pawl and when one of such dogs or projections is forced out of engagement the other one will be immediately engaged. These dogs therefore act conjointly as distinguished from independent action. Furthermore, in view of the fact that the pawl when it passes its central position will by the flat spring be quickly sprung to one side or the other, an extremely quick-acting device is provided and one in which there is no chance of a sticking or stopping of the carriage at the reversing point as frequently happens in devices of this character.

It will be seen furthermore that the use of elongated threaded nuts separated by a washer which are continuously in mesh with the screw and having toothed projections at its outer periphery enables more positive connection with the lock for the carriage than is possible with a direct engagement between a dog on the carriage and the screw thereof.

The operation of the device will be apparent from the foregoing description.

Having described my invention, I claim:—

1. Carriage-reversing mechanism for windshield cleaners and the like embodying, in combination, a rotatable-screw having oppositely-disposed threads, means for rotating the screw, a carriage mounted to travel on the screw, nuts rotatably mounted in said carriage and having interior threads engaging respectively with the oppositely-disposed screw-threads of the screw and also having exterior projections; a pivoted connecting bar mounted on said carriage and adapted alternately upon pivotal movement to connect with and prevent rotation of either of said nuts, comprising a reversing pawl having arms extending substantially at right angles and pivoted on the pivot of said bar and stops at opposite ends of said screw for swinging said pivotal pawl to engage the pivoted bar and lock the carriage to the nuts.

2. Carriage-reversing mechanism for windshield cleaners and the like embodying, in combination, a rotatable-screw having oppositely-disposed threads, means for rotating the screw, a carriage mounted to travel on the screw, nuts rotatably mounted in said carriage and having interior threads engaging respectively with the oppositely-disposed screw-threads of the screw and also having exterior projections; a pivoted connecting bar mounted on said carriage and adapted alternately upon pivotal movement to connect with and prevent rotation of either of said nuts, comprising a reversing pawl having arms extending substantially at right angles and pivoted on the pivot of said bar, stops at opposite ends of said screw for swinging said pivoted pawl to engage the pivoted bar and lock the carriage to the nuts, and a spring for forcing said pawl into its extreme positions.

In witness whereof, I have signed my name to the foregoing specification.

HOLGER BJORNWALD.